United States Patent
Ours

[11] 3,946,521
[45] Mar. 30, 1976

[54] VENTILATED PLANT PROTECTOR

[76] Inventor: Frank M. Ours, P.O. Box 370, Parsons, W. Va. 26287

[22] Filed: Feb. 13, 1974

[21] Appl. No.: 442,151

[52] U.S. Cl.................. 47/28 R; 47/19; 236/49; 236/101 R
[51] Int. Cl.[2] A01G 13/04; F24F 7/00; G05D 23/02
[58] Field of Search............. 47/26, 28, 29, 30, 17, 47/19, 2, 1; 236/49, 101

[56] References Cited
UNITED STATES PATENTS

| 585,009 | 6/1897 | Taylor et al. | 47/28 X |
|---|---|---|---|
| 817,106 | 4/1906 | Farmer | 236/49 |
| 1,290,714 | 1/1919 | Causey | 236/49 |
| 2,107,809 | 2/1938 | Warner | 236/49 |
| 2,187,767 | 1/1940 | Akers | 236/49 |
| 2,709,838 | 6/1955 | Zausner | 47/17 X |
| 2,975,975 | 3/1961 | Weber | 236/49 |
| 3,129,530 | 4/1964 | Anderson | 47/19 |
| 3,195,441 | 7/1965 | Hedrick | 236/49 |
| 3,528,606 | 9/1970 | Witten | 236/49 X |
| 3,698,131 | 10/1972 | Kesinger | 47/2 X |

FOREIGN PATENTS OR APPLICATIONS

| 1,270,399 | 12/1961 | France | 47/17 |
|---|---|---|---|
| 1,296,601 | 12/1962 | France | 47/19 |
| 1,215,951 | 4/1960 | France | 47/29 |

Primary Examiner—Edgar S. Burr
Assistant Examiner—Steven A. Bratlie
Attorney, Agent, or Firm—Strauch, Nolan, Neale, Nies & Kurz

[57] ABSTRACT

A plant protector having an elongated housing side wall opening over which is movably mounted a closure panel, the panel being pivoted on the housing at one end of the opening and being connected at the other end of the opening to a heat sensitive expansible coil mounted within the housing so that a change in air temperature within the housing effects opening movement of the panel.

1 Claim, 3 Drawing Figures

U.S. Patent   March 30, 1976   3,946,521
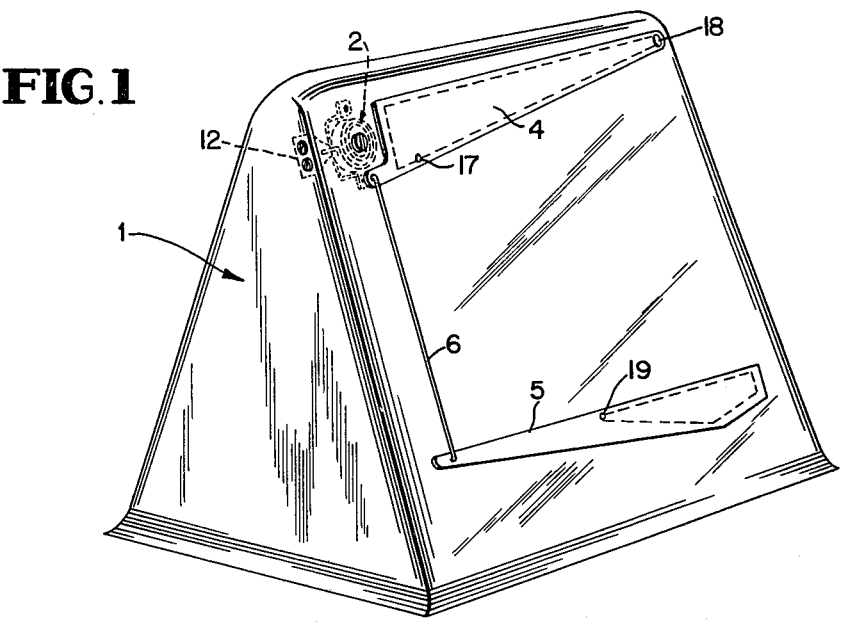
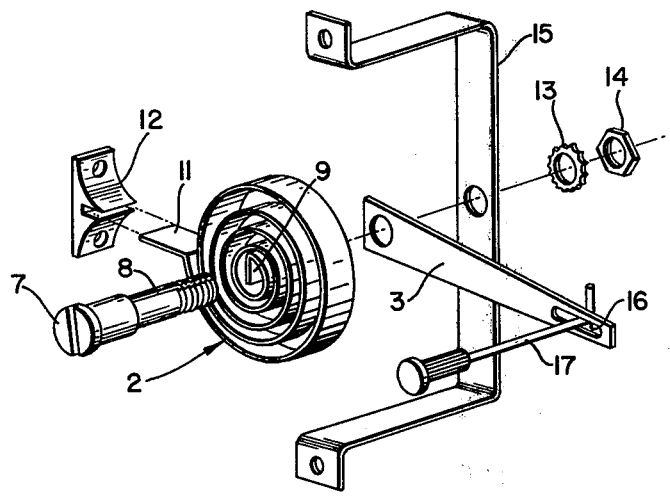
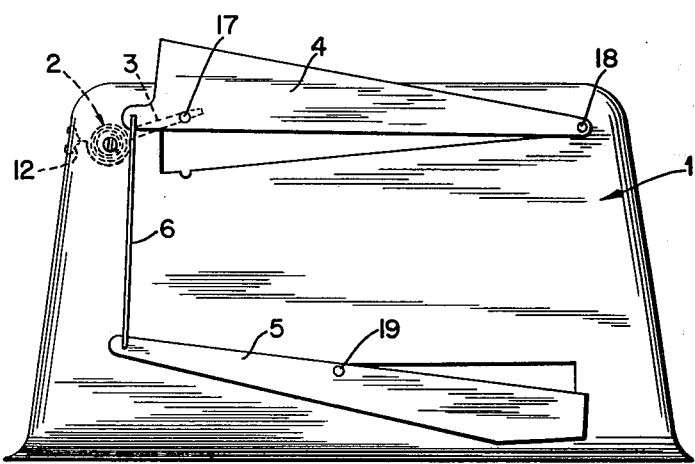

VENTILATED PLANT PROTECTOR

The object of this invention is to provide a new, inexpensive and improved plant protector to be used by gardeners to cover individual plants or groups of small plants to protect them from late frost and to eliminate the daily attendance required of hot caps, jugs and tenting.

The device consists of a plastic A-frame that is easily formed thermally and is of a shape that is stackable for storage and transport. Affixed thereon are two ventilation panels controlled by an interior thermostatic apparatus which, in turn, is activated by the atmospheric conditions within the said device.

In order that the invention may be fully understood, reference will now be made to the accompanying drawings, in which:

FIG. 1 is a three-dimensional view of the improvement and its functioning parts. 1 of FIG. 1 is the thermally-formed shell to which the moving parts are secured. 2 of FIG. 1 is the thermostatic device that activates control arm 3 of FIG. 2, which in turn raises or lowers the top ventilator panel 4 of FIG. 1, and this same motion is transferred to ventilator panel 5 of FIG. 1 by means of connecting rod 6 of FIG. 1. As shown in FIGS. 1 and 3, panels 4 and 5 are arranged to cover or uncover side wall openings of shell or housing 1.

FIG. 2 is an exploded view of the thermostatic device with its related parts. 7 of FIG. 2 is a slotted and threaded pivot pin, which is placed in the pivot hole of the plastic shell 1 of FIG. 1. Into the slot 8 the center 9 of the thermostat coil 2 of FIG. 2 is fitted with its free end 11 then being secured in retainer 12 of FIG. 2, which is attached to the plastic shell 1 as shown in FIG. 1. A star lock washer 13 of FIG. 2 is then placed on the slotted pivot pin 7 of FIG. 2 followed by the control arm 3 of FIG. 2, which is secured between and adjusted by a lock nut 14 of FIG. 2. The mechanism as aforedescribed in FIG. 2 is held in place by a center holed bracket 15 of FIG. 2 into which the pivot pin extends, and the bracket being affixed to the interior of the plastic shell 1 of FIG. 1. The control arm 3 is secured next to the inner end of thermally sensitive coil 2 and rocks with pivot pin 7 about the pivot axis of pin 7 with variations in air temperature within housing 1 and has a lost motion connection to panel 4 through a slot 16 and a pin 17 fixed to panel 4.

FIG. 3 is a face-on view of the plant protector with the ventilator panels in their open position. The interior heat activates the thermostat 2 of FIG. 3 which rocks the control arm 3 of FIG. 3, and this in turn lifts the ventilator panel 4 of FIG. 3 by exerting upward pressure on the ventilator pin 17 of FIG. 3. As shown best in FIG. 3 the effective axis of coil 2 is substantially parallel to the pivot axis 18 of panel 4. As ventilator panel 4 of FIG. 3 moves upward, so too does ventilator panel 5 of FIG. 3, as they are counterbalanced and connected by a rod 6 of FIG. 3. Ventilator panel 4 of FIG. 3 is hinged at a point 18 on the housing 1, and ventilator panel 5 of FIG. 3 is hinged at a point 19 on the housing 1. The movement of the ventilating panels permits the free circulation of air within the growing environs of the plant protector. On warm days they open; on cool days or on frosty nights they are closed to maintain the best possible growing environment.

Having thus fully described my invention, I claim as new and desire to secure by letters patent:

1. A plant protector comprising a housing adapted to substantially enclose a plant or group of plants to be protected, an elongated ventilation opening in a wall of said housing, an elongated panel extending adjacently along said opening and having one end pivotally mounted on said housing wall to turn about a pivot axis at one end of said opening, said panel pivotally moving in a plane parallel to said housing wall between a position closing said opening and at least one other position selectively uncovering said opening, means for controlling the position of said panel comprising a thermally responsive device mounted within the housing so as to be subject to the air temperature within the housing, said device comprising an expansible heat sensitive coil having one end anchored on said housing wall, the other of said coil attached to a pivot pin extending between said housing wall and a bracket thereon, a motion transmitting control arm secured at one end to the pivot pin and pivotally connected at its other end to the other end of said panel adjacent the other end of said opening whereby a variation in air temperature within the housing may actuate said coil to move said control arm for pivoting said panel relative to said opening, the axis of the coil being substantially parallel to said pivot axis of the panel.

* * * * *

UNITED STATES PATENT OFFICE
CERTIFICATE OF CORRECTION

PATENT NO. : 3,946,521
DATED : March 30, 1976
INVENTOR(S) : Frank M. Ours

It is certified that error appears in the above-identified patent and that said Letters Patent are hereby corrected as shown below:

Column 2, line 38, insert --end-- after "other".

Signed and Sealed this first Day of June 1976

[SEAL]

Attest:

RUTH C. MASON
Attesting Officer

C. MARSHALL DANN
Commissioner of Patents and Trademarks